(12) United States Patent
Chalasani et al.

(10) Patent No.: US 12,008,037 B2
(45) Date of Patent: Jun. 11, 2024

(54) METHOD OF VIDEO SEARCH IN AN ELECTRONIC DEVICE

(71) Applicant: Samsung Electronics Co., Ltd., Suwon-si (KR)

(72) Inventors: Sathish Chalasani, Bangalore (IN); Ujjawal Soni, Kota (IN); Kiran Nanjunda Iyer, Bangalore (IN); Shreyasi Das, Kolkata (IN); Samarjeet Sahoo, Mumbai (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 17/554,658

(22) Filed: Dec. 17, 2021

(65) Prior Publication Data
US 2022/0147565 A1    May 12, 2022

Related U.S. Application Data

(63) Continuation of application No. PCT/KR2021/015810, filed on Nov. 3, 2021.

(30) Foreign Application Priority Data

Nov. 3, 2020  (IN) .............................. 202041047914
Oct. 28, 2021 (IN) ............................ 2020 41047914

(51) Int. Cl.
*G06F 16/738*    (2019.01)
*G06F 16/732*    (2019.01)
(Continued)

(52) U.S. Cl.
CPC .......... *G06F 16/739* (2019.01); *G06F 16/732* (2019.01); *G06F 16/743* (2019.01);
(Continued)

(58) Field of Classification Search
CPC .... G06F 16/739; G06F 16/732; G06F 16/743; G06F 16/7867; G06N 3/08; G06V 20/46
(Continued)

(56) References Cited

U.S. PATENT DOCUMENTS 8,068,677 B2 * 11/2011 Varadarajan .......... G06F 16/583
                                                              382/173
11,017,015 B2    5/2021 Han et al.
(Continued)

FOREIGN PATENT DOCUMENTS

KR    10-2019-0106865 A    9/2019
KR    10-2020-0063316 A    6/2020
(Continued)

OTHER PUBLICATIONS

International Search Report with Written Opinion dated Feb. 10, 2022; International Appln. No. PCT/KR2021/015810.

*Primary Examiner* — Helen Shibru
(74) *Attorney, Agent, or Firm* — Jefferson IP Law, LLP

(57) ABSTRACT

A method of video search in an electronic device is provided. The method includes extracting a plurality of visual features vectors comprising visual features from a plurality of videos stored in a video database, wherein each visual feature corresponds to a pre-defined moment, generating a temporal map of the plurality of visual feature vectors, generating at least one video tag and at least one time stamp associated with the visual feature vector, storing the at least one video tag, the visual feature vectors and the at least one time stamp for each visual feature in a vector database, receiving a search query from a user for a specific moment in a plurality of videos in the electronic device, running the search query on the vector database, and displaying visual features associated with the specific moments from the plurality of videos.

19 Claims, 8 Drawing Sheets

(51) Int. Cl.
  *G06F 16/74* (2019.01)
  *G06F 16/78* (2019.01)
  *G06N 3/08* (2023.01)
  *G06V 20/40* (2022.01)
(52) U.S. Cl.
  CPC ........... *G06F 16/7867* (2019.01); *G06N 3/08* (2013.01); *G06V 20/46* (2022.01)
(58) Field of Classification Search
  USPC .......................................................... 386/241
  See application file for complete search history.

(56) References Cited

U.S. PATENT DOCUMENTS

| | | | |
|---|---|---|---|
| 11,151,191 | B2 | 10/2021 | Hsieh et al. |
| 11,748,405 | B2 * | 9/2023 | Savir .................... G06F 16/739 707/722 |
| 2016/0103830 | A1 | 4/2016 | Cheong et al. |
| 2017/0270203 | A1 | 9/2017 | Liu |
| 2019/0108399 | A1 | 4/2019 | Escorcia et al. |
| 2019/0304104 | A1 | 10/2019 | Amer et al. |
| 2019/0354608 | A1 | 11/2019 | Depaz et al. |
| 2020/0065324 | A1 | 2/2020 | Watanabe et al. |
| 2020/0327160 | A1 | 10/2020 | Hsieh et al. |
| 2021/0064882 | A1 | 3/2021 | Kim et al. |
| 2022/0261550 | A1 * | 8/2022 | Moon .................... G06V 10/25 |
| 2024/0020870 | A1 * | 1/2024 | Yang .................... G06V 20/54 |

FOREIGN PATENT DOCUMENTS

| | | |
|---|---|---|
| KR | 10-2161230 B1 | 9/2020 |
| KR | 10-2202372 B1 | 1/2021 |
| WO | 2018/232378 A1 | 12/2018 |

\* cited by examiner

METHOD OF VIDEO SEARCH IN AN ELECTRONIC DEVICE

CROSS-REFERENCE TO RELATED APPLICATION(S)

This application is a continuation of International application No. PCT/KR2021/015810, filed on Nov. 3, 2021, which is based on and claims the benefit of Indian Provisional patent application number 202041047914, filed on Nov. 3, 2020, in the Indian Intellectual Property Office, and Indian Complete patent application number 202041047914, filed on Oct. 28, 2021, in the Indian Intellectual Property Office, the disclosure of each of which is incorporated by reference herein in its entirety.

FIELD OF INVENTION

The disclosure relates to video processing. More particularly, the disclosure relates to a method of searching video corresponding to a specific moment in a video database in an electronic device.

BACKGROUND

Video processing is a well-known technique in the art. Searching a video in a video database corresponding to a moment in a user query is performed using video processing. conventional techniques include methods which take a lot of time to search a video in the video database as the video database is large in size.

Further, the conventional techniques include running the user query on the large video database for obtaining the desired video. However, none of the conventional techniques include creating a separate smaller database with a metadata information about the videos in the actual video database which is used in real time upon receipt of the user query. There is no existing on-device solution, which works in real time.

The above information is presented as background information only to assist with an understanding of the disclosure. No determination has been made, and no assertion is made, as to whether any of the above might be applicable as prior art with regard to the disclosure.

OBJECT OF INVENTION

Aspects of the disclosure are to address at least the above-mentioned problems and/or disadvantages and to provide at least the advantages described below. Accordingly, an aspect of the disclosure is to provide an on-device method for video searching in real-time. The videos in a video database are sent to a neural network (NN). The NN determines moments in the videos and creates a tag corresponding to a time stamp for each moment in the video. The tags are generated by localization and classification. Further, the tags and the time stamp are indexed to the video. For each video, the corresponding time stamp related feature vectors are stored in a vector database. The above steps are performed off-line.

A user query is received asking for a moment in the videos. A search is performed in real-time on the vector database instead of video database, thus considerably reducing the search time. Further, the desired video is displayed based on the search.

Additional aspects will be set forth in part in the description which follows and, in part, will be apparent from the description, or may be learned by practice of the presented embodiments.

SUMMARY

In accordance with an aspect of the disclosure, a method of video search in an electronic device is provided. The method includes extracting, by the electronic device, a plurality of visual features vectors comprising visual features from a plurality of videos stored in a video database of the electronic device, wherein each visual feature corresponds to a pre-defined moment, generating, by the electronic device, a temporal map of the plurality of visual feature vectors, generating, by the electronic device, video tags and time stamps associated with the visual feature vector for each visual feature in the plurality of visual feature vectors, storing, by the electronic device, the videos tags, the visual feature vectors and the time stamp for each visual feature in a vector database, receiving, by the electronic device, a search query from a user for a specific moment in a plurality of videos in the electronic device, running, by the electronic device, the search query on the vector database, and displaying, by the electronic device, visual features associated with the specific moments from the plurality of videos based on the video tags, the plurality of feature vectors and the time stamps in the vector database.

The extracting, by the electronic device, of the plurality of visual features from the plurality of videos stored in the video database may include inputting, by the electronic device, each video from the plurality of videos in the videos database to a neural network specific to feature extraction, performing, by the neural network specific to feature extraction, a bi-directional shifting of parts of each frame of the plurality of videos in the video database along a temporal dimension, performing, by the neural network specific to feature extraction, an average-maximum pooling in temporal domain to obtain a pooled clip feature vector, determining, by the neural network specific to feature extraction, that a score of the features matches a threshold value, and extracting, by the neural network specific to feature extraction, the plurality of visual features from the plurality of videos in response to the threshold value being met.

The generating of the temporal map may include passing, by the electronic device, the pooled clip feature vector through bi-directional gated recurrent units (GRU) to get a moment proposal vector, and forming, by the electronic device, a convolutional feature map using the proposal moment proposal vectors.

The generating the plurality of feature vectors, the video tags and associated time stamps for each visual feature from the plurality of visual features may include tagging, by the electronic device, each visual feature vector extracted in each video with a specific tag, determining, by the electronic device, a time and a duration of each visual feature in each video, providing, by the electronic device, the time stamp to each visual feature in each video based on the time and a duration, and storing, by the electronic device, the plurality of feature vector, the tags and the associated time stamp.

The displaying of the visual features corresponding to specific event may include extracting, by the electronic device, linguistic visual features using natural language processing (NLP) from the search query, comparing, by the electronic device, the extracted linguistic visual features from the search query with the visual features from the plurality of feature vectors using the video tags in the vector database, identifying, by the electronic device, the visual features vector based on the video tags which has a best match with the linguistic visual features, extracting, by the electronic device, the video for which the visual feature is selected from the video database, and displaying, by the electronic device, the extracted video to the user, wherein the extracted video comprises the specific moments asked in the search query.

The pre-defined moments may be an activity in the video.

In accordance with another aspect of the disclosure, an electronic device for performing video search is provided. The electronic device includes a visual feature extractor, a moment localizer, a moment classifier, a semantics generator, a query searcher, a tag searcher, a memory, a processor, and a communicator.

The visual feature extractor may be responsible for extracting a plurality of visual features vectors comprising visual features from a plurality of videos stored in a video database of the electronic device, wherein each visual feature corresponds to a pre-defined moment.

A moment localizer may be configured to generate a temporal map of the plurality of visual feature vectors. The moment classified may be configured to generate video tags and time stamps associated with the visual feature vector for each visual feature in the plurality of visual feature vectors, storing, by the electronic device, the videos tags, the visual feature vectors and the time stamp for each visual feature in a vector database. The semantic generator may be configured to receive a search query from a user for a specific moment in a plurality of videos in the electronic device. The query searcher may be configured to run the search query on the vector database. The electronic device may be configured to display visual features associated with the specific moments from the plurality of videos based on the video tags, the plurality of feature vectors and the time stamps in the vector database.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF INVENTION

Figure 1:
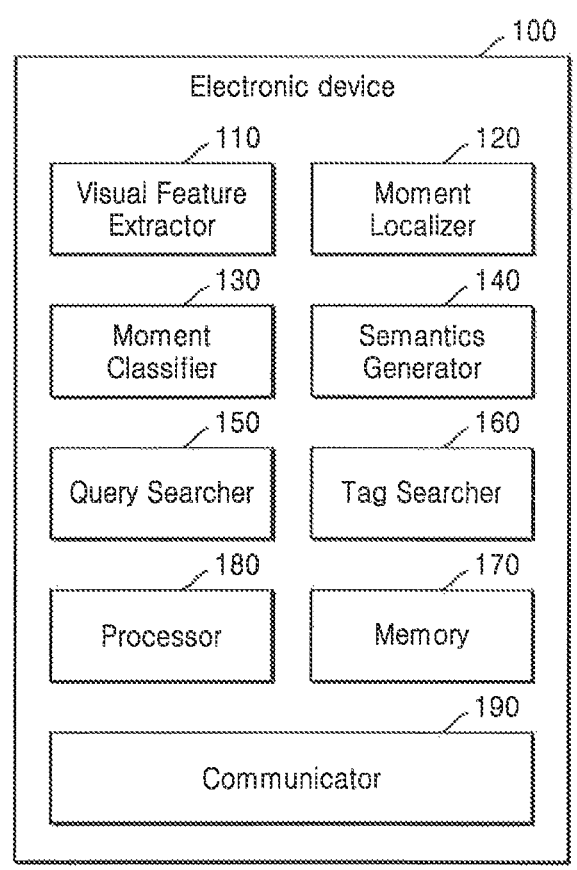
FIG. 1 is a block diagram of an electronic device for performing video search, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, controllers, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiment herein provides an electronic device and a method for performing video search. The proposed method and device involve an architecture which supports, multiple tasks with efficient re-use of architecture between the tasks of localizing moments, classifying and retrieving the moments in a gallery search of a mobile device. The proposed architecture is split into two kinds of networks, an offline network and an online network. The offline network generates feature vectors, localize moments, and classify the moments with tag based approach. The visual moment feature vectors relating to the moment are stored in the feature vector database. The tags thus generated are used in a tag based search. The online network is activated when a user wants to retrieve the video with query based search in real time. Given a query, a semantic vector from the query is compared to visual moment vectors in the data base, to quickly retrieve the moments related to the query.

Unlike conventional techniques, the proposed architecture is a novel design, which is simple, affective in following multiple tasks, tag based moment classification, localization and retrieval (with tag and query). A visual feature network which acts as visual feature extractor is a light weight engine with a temporal shift module. The feature vectors are pooled in a temporal dimension to get to a fixed number of vectors. For each index in a two dimensional (2D) map, the vectors are gated across its respective time span to get temporal context. The 2D map undergoes several 2D convolutions to build global context across the video before, predicting moment classification and localization for tag based retrieval. The localized predictions done with tag based are used to get the features to train for multi modal alignment to aid for query based search. The entire architecture design, is intended to work real time for query based search, and offline for tag based search. The proposed network can be used with tag based search and query based search. This set up makes it feasible to conveniently port it to a device with limited computational and memory resources during a query time.

Referring now to the drawings, and more particularly to FIGS. 1 through 8 where similar reference characters denote corresponding features consistently throughout the figures, there are shown preferred embodiments.

FIG. 1 is a block diagram of an electronic device (100) for performing video search, according to an embodiment of the disclosure. The electronic device (100) may be, for example, but not limited to, a mobile device, a cellular phone, a smartphone, a personal digital assistant (PDA), a tablet computer, a laptop computer, an Internet of things (IoT) device, an artificial intelligent (AI) device or the like.

Referring to FIG. 1, the electronic device (100) comprises a visual feature extractor (110), a moment localizer (120), a moment classifier (130), a semantics generator (140), a query searcher (150), a tag searcher (160) a memory (170), a processor (180), and a communicator (190).

The electronic device works in an offline mode and an online mode. The online mode includes performing an operation by the electronic device (100) in real time upon receiving a query from a user for searching a video with specific moments in a video database (171). The video database (171) is a gallery of the electronic device or any other part of the memory (170) where the videos are saved. The specific moments in the user query may such as a candle blowing moment, a cake cutting moment, a celebration moment, a tennis playing moment etc. The user may request any moment in the user query.

The offline mode includes performing an operation by the electronic device (100) before a query is received or when the video is stored in the video database.

The offline mode: The memory (170) comprises the video database (171) where all the videos either captured by a camera of the electronic device (100) or received by the electronic device are stored.

Upon detection of a video in the video database, the visual feature extractor (110) extracts relevant visual features from the video detected. The visual feature extractor (110) sends the video detected to a temporal shift module (TSM) based neural network (NN). The visual features in the video corresponds to an object identified in the video, an image in the video, a specific motion, and the like. Extraction of the visual features using the visual feature extractor (110) is explained in detail further below.

Upon extraction of the visual features, the moment localizer (120) creates a temporal map of the extracted visual features for localization. The localization of the visual features refers to determining boundaries of the extracted visual features. The temporal map is a convolution feature map. Convolution three dimensional (3D) operations are performed on the temporal map for obtaining a final map. The moment classifier (130) classifies the different visual features in the final map and generates a tag for each visual feature in the final map. The tags are associated with a time stamp for each visual feature in the final map. The tag assigned and/or generated to each visual feature are determined based on the information about the visual feature. The time stamp indicates the time of a frame comprising the visual feature in the corresponding video. For example, for a video of a girl blowing a candle, tags are generated for the moment blowing candle, clapping hand, or cake cutting etc. The tags may also be assigned to the girl, the cake and the like. The time stamp of each tag indicates the time in the video when the moment or the object in the video appears/happens. For example, if the girl is blowing the candle at 2 mins to 2 mins, 30 sec in the video, then the time stamp is allotted accordingly.

Finally, the tags along with the respective time stamps are indexed to video file. Further, the feature vectors are stored in a vector database. The vector database (174) is a database in the memory (170) of the electronic device (100). The vector database (172) comprises information about the visual features present in all the videos stored in the video database (171).

Thus, as described above, in the offline mode, the electronic device (100) analyzes the videos received in the video database (171) and stores information about the visual features in the vector database. Thus, the vector database is smaller in size.

Online mode: The online mode is active when the electronic device receives the query from the user. In an embodiment, upon receiving the query from the user, the semantic generator (140) extracts linguistic features from the search query. In an embodiment, the semantic generator (140) breaks a query sentence into word tokens and transforms them into corresponding (pre-trained) word embedding. Further, the word embedding is passed through a long short term memory (LSTM) based sequence encoder network to obtain a feature vector for the query sentence.

The query searcher (150) compares the linguistic features of the query with visual moment features stored in the video database (171). Also, the tag searcher (160) searches for tags and time stamps associated with the visual features in the vector database. Upon obtaining the time stamps, the tags, and the visual features, the moments related with the visual features are displayed to the user.

Thus, as seen above, upon receiving the query, the electronic device (100) does not access the video database (171) but the vector database for finding the desired moments in the videos.

Further, the tag based approach for classification, localization and retrieval is fast and in real time. Whereas the tagging and storing the extracted visual features in video database (171) happen in background on the gallery database. Thus, the proposed method and device is efficient.

In another embodiment, the visual feature extractor (110), the moment localizer (120), the moment classifier (130), the semantics generator (140), the query searcher (150), and the tag searcher (160) may further comprise additional sub-controllers implemented by processing circuitry such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductor chips, or on substrate supports such as printed circuit boards and the like.

The memory (170) comprises the video database (171) and the vector database (172). The video database (171) may be a gallery of the electronic device (100), where the videos are stored.

The memory (170) stores instructions to be executed by the processor (180). The memory (170) storage elements may include magnetic hard discs, optical discs, floppy discs, flash memories, or forms of electrically programmable read only memory (EPROM) or electrically erasable programmable read only memory (EEPROM).

In addition, the memory (170) may, in some examples, be considered a non-transitory storage medium. The term "non-transitory" may indicate that the storage medium is not embodied in a carrier wave or a propagated signal. However, the term "non-transitory" should not be interpreted that the memory (170) is non-movable. In some examples, the memory (170) can be configured to store larger amounts of information than the memory. In certain examples, a non-transitory storage medium may store data that can, over time, change (e.g., in random access memory (RAM) or cache). The memory (170) can be an internal storage or it can be an external storage unit of the electronic device (100), a cloud storage, or any other type of external storage.

In an embodiment, the processor (180) communicates with, the visual feature extractor (110), the moment localizer (120), the moment classifier (130), the semantics generator (140), the query searcher (150), the tag searcher (160), the memory (170), and the communicator (190). The processor (180) is configured to execute instructions stored in the memory (170). The processor (180) may include one or a plurality of processors, may be a general purpose processor, such as a central processing unit (CPU), an application processor (AP), or the like, a graphics-only processing unit such as a graphics processing unit (GPU), a visual processing unit (VPU), and/or an artificial intelligence (AI) dedicated processor such as a neural processing unit (NPU).

In an embodiment, the communicator (190) is configured for communicating internally between internal hardware components and with external devices via one or more networks. The communicator (190) includes an electronic circuit specific to a standard that enables wired or wireless communication.

Although FIG. 1 shows various hardware components of the electronic device (100), it is to be understood that other embodiments are not limited thereon. In other embodiments, the electronic device (100), may include a lessor or greater number of components. Further, the labels or names of the components are used only for illustrative purposes and does not limit the scope of the disclosure. One or more components can be combined together to perform a same or substantially similar function for performing the video search.

Figure 2:
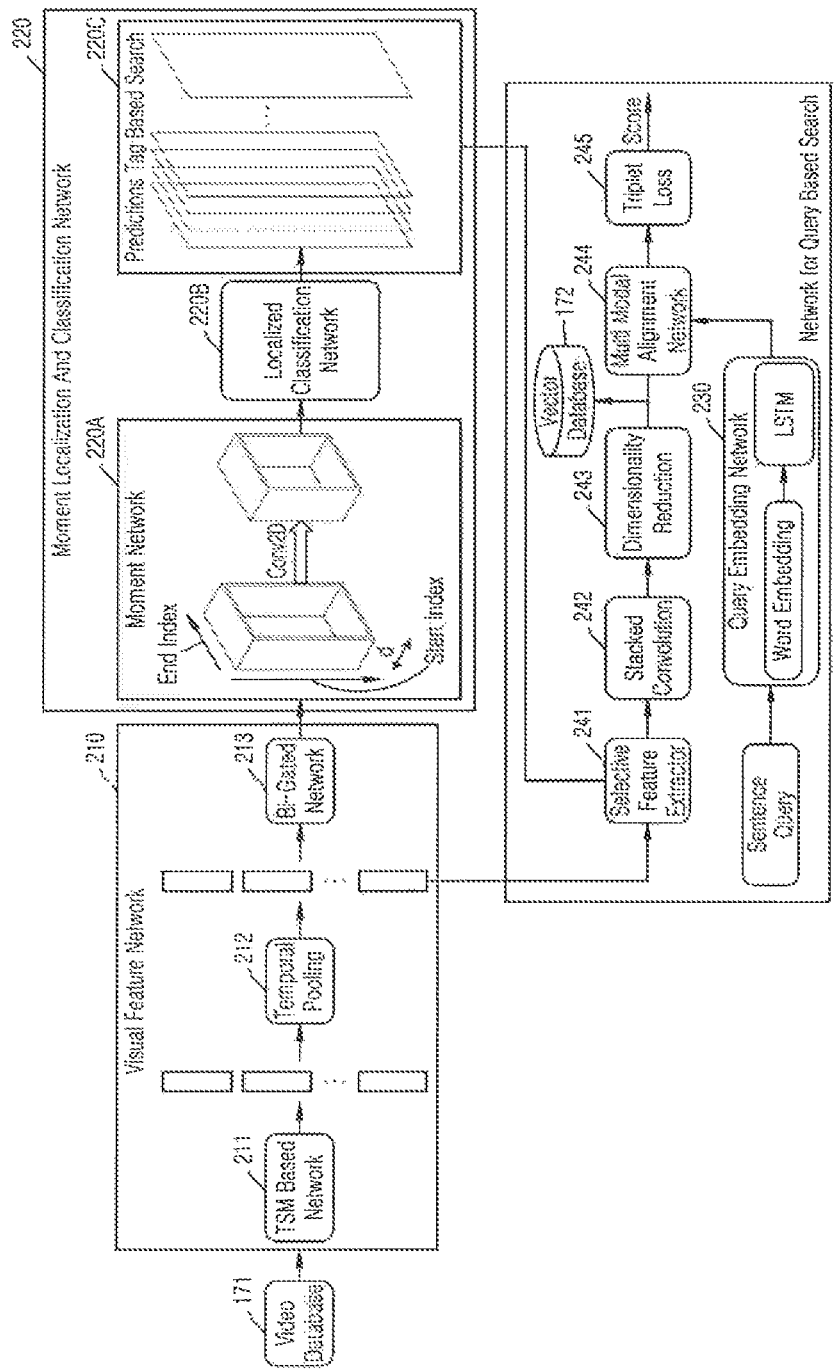
FIG. 2 is a block diagram illustrating an architecture for performing video search, according to an embodiment of the disclosure.

FIG. 2 is a block diagram illustrating an architecture for performing video search, according to an embodiment of the disclosure.

Referring to FIG. 2, a video is received by the video database (171) and sent to a visual feature network (210). The architecture comprises the visual feature network (210), a moment localization and classification network (220), and a query embedding network (230). The visual feature network (210), the moment localization, and the classification network (220) operate in the background, whereas the query embedding network (230) works in real time when the user query is received.

The visual feature network (210) is handled by the visual feature extractor (110) and is responsible for extracting the visual features in the videos present in the video database (171). As seen in FIG. 2, the visual feature network (210) comprises a TSM based network (211), a temporal pooling block (212) and a bi-gated network (213).

In an embodiment, the TSM based network (211) takes the video received by the video database (171) and performs a bi-directional shifting along a temporal dimension. The bi-directional shifting facilitates exchange of information among neighbouring frames in the video. The output of the TSM based network (211) is a plurality of feature vectors ($F^1$-$F^k$). The TSM based network (211) avoids heavy computation required for modelling of video data, thus saving time and battery consumption of the electronic device (100). The plurality of feature vectors ($F^1$-$F^k$) are sent to the temporal pooling block (212). The temporal pooling block (212) pools the plurality of vector features in a temporal dimension to obtain a fix number of vectors ($T^d_1$-$T^d_M$). The fixed number of vectors $T^d_1$-$T^d_M$ are forwarded to the bi-gated network (213).

The bi-gated network (213) employs gated recurrent units (GRUs) to capture temporal dependencies among the fixed number of the feature vectors $T^d_1$-$T^d_M$ of the video frame data. The bi-gated network (213) generates a moment proposal vector and forwards the same to the moment localization and classification network (220).

The moment localization and classification network (220) may include a moment network 220A, a localized classification network 220B, and a prediction for tag based search 220C. The moment localization and classification network (220) is responsible for localising the visual features extracted and classifying them. Further, the moment localization and classification network (220) created tags for each visual feature. In an embodiment, the moment proposal vector is used to form a convolutional feature map. The convolutional feature map is provided as an input sequence of convolution 2D (conv2d) operations to build global context across the video before, predicting moment classification and localization for tag based retrieval. Further, a final prediction map containing N×N proposal scores, with T channels, each representing a class category is obtained. Symmetric bins are fused for final scores. A fusion operation chosen may be average fusion. Each channel in the map represents a class category. T channels represent T classes, one channel for each class. Inside a channel, there are N×N temporal map bins, representing a time stamp in the video. Localized predictions are performed along with the tagging and stored in the vector database (172).

In an embodiment, there is a classification layer which classifies the individual grid cells in the temporal map to output the tag (predicted class) of that grid cell. Now each cell of the temporal map corresponds to a particular time interval. Hence, the moment predictions. For full video classification, the predicted tags of all cells are aggregated.

The localized moments in the previous operation are also used to extract the corresponding pooled feature vectors, which are then reduced in dimension and stored in the vector database. This makes the video retrieval much simpler and quicker.

The moment localization and classification network (220) may have more units and components for localising and tagging the visual features.

Thus, the visual feature network (210) and the moment localization and classification network (220) stores information about the visual features of the videos in the vector database (172).

In another embodiment, a selective visual feature extractor block (241) extracts visual features based on the output of the visual feature network (210). Further, block (242) performs stacked convolution. Block (243) performs dimension reduction. Block (245) indicates a triplet loss fiction for the NN.

The visual feature network (210) may have more units and components for determining the visual features of the video stored in the video database.

Once the query is received from the user, the query embedding network (230) obtains a feature vector for a complete query sentence.

In an embodiment, a linguistic module breaks the input query sentence into word tokens which are transformed into corresponding (pre-trained) word embedding in vector space. The word embedding is passed through a long short term memory (LSTM) based sequence encoder network to get a feature vector for the complete query sentence (query embedding).

The feature vector for the query is then passed to a multimodal alignment network (244). The multimodal alignment network (244) compares the query features with visual moment features stored in video database (171).

Although FIG. 2 shows various hardware components of the electronic device (100), it is to be understood that other embodiments are not limited thereon. In other embodiments, the electronic device (100) may include a lesser or greater number of components. Further, the labels or names of the components are used only for illustrative purposes and does not limit the scope of the disclosure. One or more components can be combined together to perform a same or substantially similar function for performing the video search.

Figure 3:
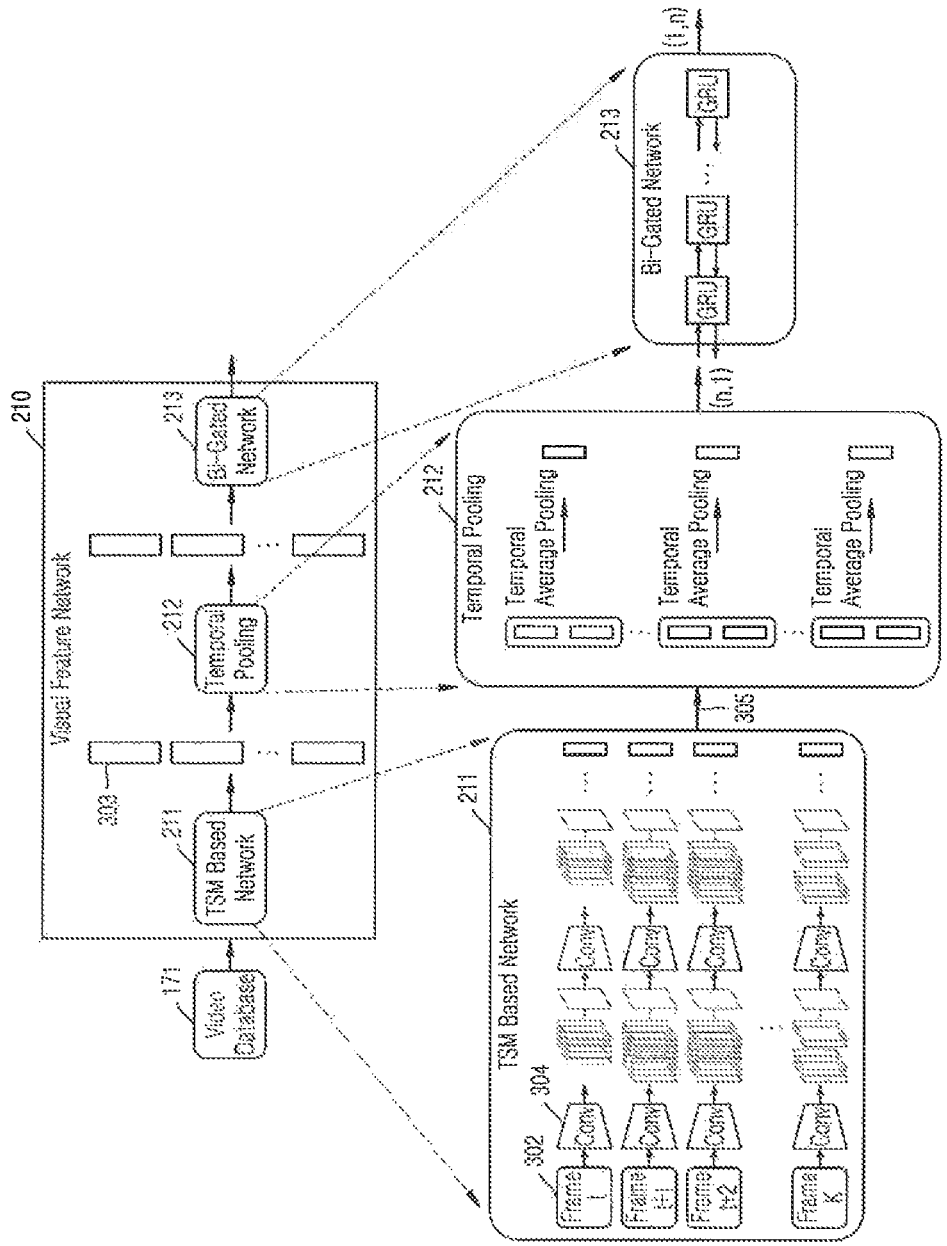
FIG. 3 is a schematic diagram illustrating the visual feature network for determining the visual features, according to an embodiment of the disclosure.

FIG. 3 is a schematic diagram illustrating the visual feature network for determining the visual features, according to an embodiment of the disclosure.

Referring to FIG. 3, block (302) displays the functioning of the TSM based network (211). The TSM based network (211) of the visual feature network (210) receives the video from the video database (171) as the input. The video comprises a plurality of frames ($F^t$-$F^k$) (303), where each frame carries different information about a scene in the video. A convolution (304) is performed in each frame of the plurality of frames ($F^t$-$F^k$). The convolution step is collectively denoted as (304). The output of the convolution step is denoted as (305). Convolution is again performed. In an embodiment, the TSM based network (211) employs the bi-directional shifting of part of the video frames along temporal dimension to facilitate the exchange of information among neighbouring frames. The final output of the TSM based network (211) are the frame feature vectors $F^t$-$F^k$ which are forwarded to the temporal pooling block (212) as seen at (305). The temporal pooling block (212) performs frame reduction by average/maximum pooling in temporal domain, wherein interpolation of the feature vectors is performed to bring a definite number of the feature vectors. The frame feature vectors $F^t$-$F^k$ are pooled in temporal domain to obtain pooled clip feature vector $T^d_1$-$T^d_m$ as seen at 306. Further, the bi-gated network (213) employs the GRUs on the pooled clip feature vectors to capture temporal dependencies among feature vectors of video frame data in form of the moment proposal vector.

Figure 4:
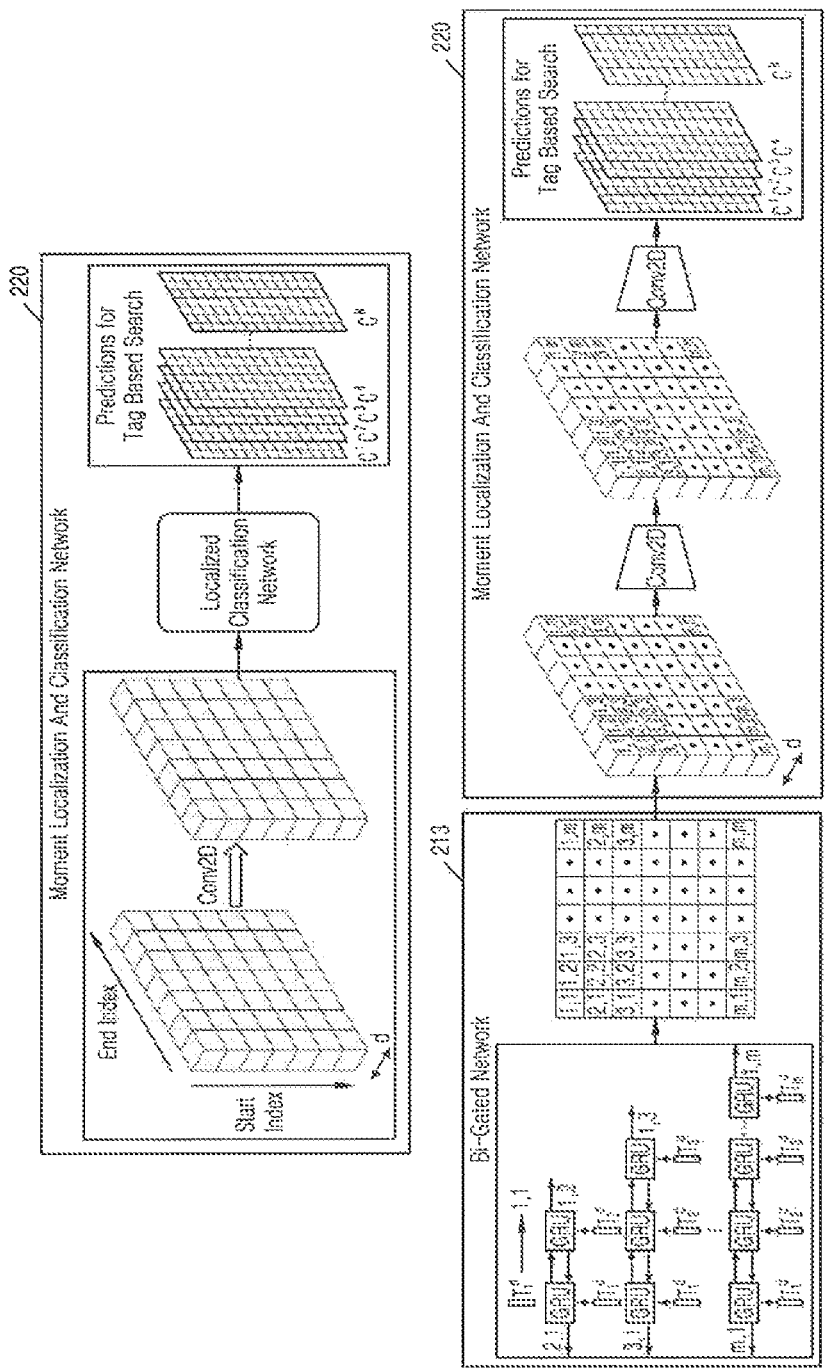
FIG. 4 is a schematic diagram illustrating the moment localization and classification network, according to an embodiment of the disclosure.

FIG. 4 is a schematic diagram illustrating the moment localization and classification network (220), according to an embodiment of the disclosure.

The moment localization and classification network (220) forms the convolution feature map form the upper triangle matrix and backward proposal vector form the lower triangle matrix as illustrated in FIGS. 1 and 4.

The convolution feature map is sent as an input to the convolution 2D operations. Final prediction map contains N×N proposal scores, with T channels, each representing a class category. The symmetric bins are fused for final scores. The fusion operation chosen may be an average fusion.

Figure 5:
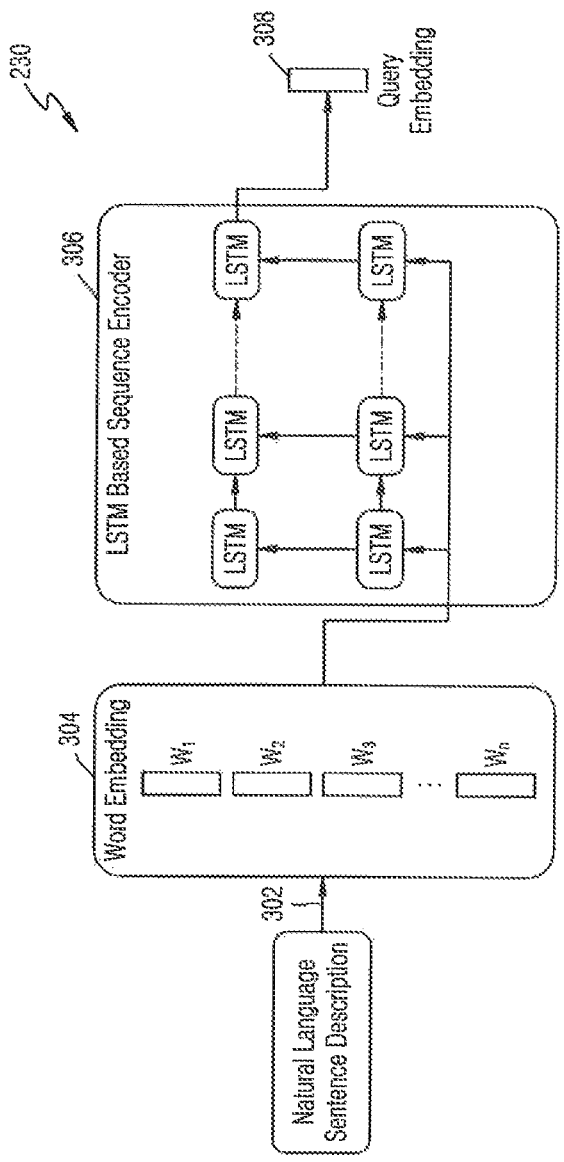
FIG. 5 is a schematic diagram illustrating the query embedding network, according to an embodiment of the disclosure.

FIG. 5 is a schematic diagram illustrating the query embedding network (230), according to an embodiment of the disclosure.

The query embedding network (230) receives the search query in natural language as an input at (302). The query embedding network (230) comprises the linguistic model which breaks the input search query sentence into word tokens which are transformed into corresponding (pre-trained) word embedding in vector space at seen at (304). The word embedding is passed through the LSTM based sequence encoder network at (306) to get a feature vector for the complete query sentence (query embedding) at (308).

Figure 6:
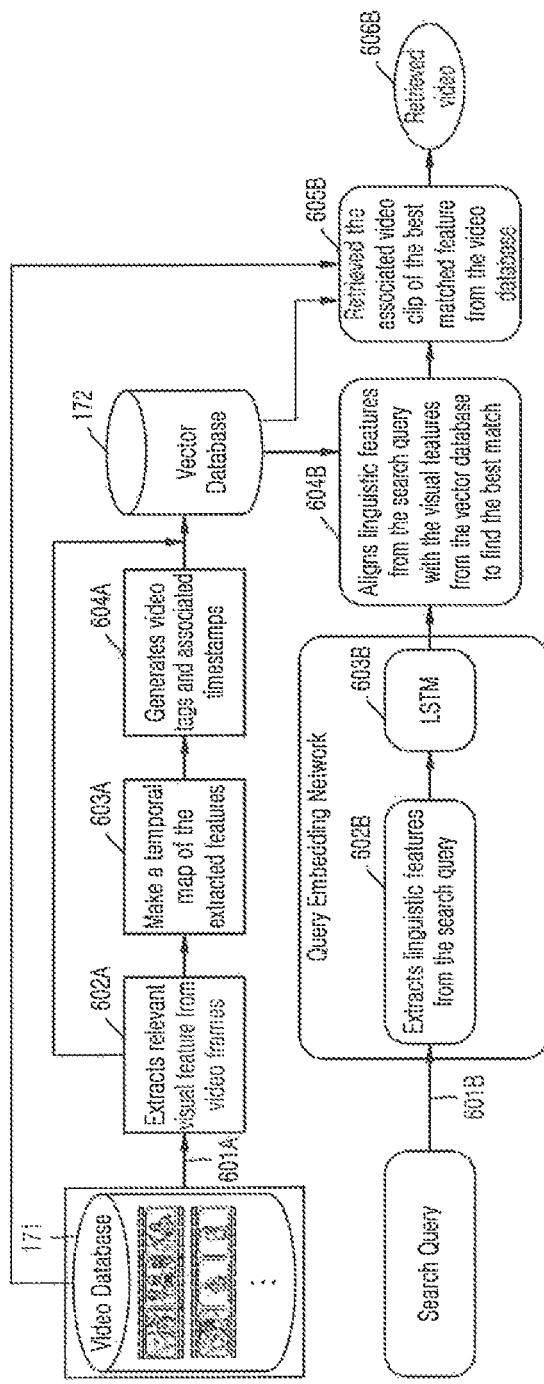
FIG. 6 is a flow diagram illustrating the method of performing video search, according to an embodiment of the disclosure.

FIG. 6 is a flow diagram illustrating the method of performing video search, according to an embodiment of the disclosure.

The flow diagram illustrated two different modes: the offline mode beginning at (601A) and the online mode beginning at (601B).

At (600A), the visual feature network (210) receives the video stored in the video database (171) as an input. At (602A), the visual feature network (210) extracts the visual feature from the video, where each visual feature corresponds to a pre-defined moment. The pre-defined moments may be, for example, a sports event, a celebration moment, a sad moment, and the like.

The visual feature network determines the fixed number of feature vector from the plurality of feature vectors of the video. Further, the fixed number of feature vectors are pooled in the temporal domain for obtaining the pooled clip feature vector. Further, the pooled clip feature vector is sent to the moment network of the moment localization and classification network (220).

At (603A), the moment localization and classification network (220) makes the temporal map of the extracted features which helps in localization. At (604A), the moment localization and classification network (220) generates the video tags and associated timestamps. Moment localization and classification network (220) also helps generate feature vectors of the localized videos, which are used in query based searching. The generated the video tags and associated timestamps are stored in the vector database (172).

The online flow is activated after the user query is received. At (601B), the user query is received by the query embedding network (230). At (602B), the query encoder breaks the input search query sentence into word tokens which are transformed into corresponding (pre-trained) word embedding in vector space at seen. At (603B), the word embedding is passed through the LSTM based sequence encoder network to get the feature vector for the complete query sentence (query embedding).

At (604B), the multimodal alignment network (244) aligns the linguistic features from the search query with the visual features from the vector database (172) to find the best match. At (605B), the vector to video indexing, retrieves the associated video clip of the best matched feature from the video database. At (606B), the retrieved video clip is displayed on a screen of the electronic device (100).

Thus, as seen above, the proposed method is divided into two sections during inference to reduce real time computational complexity:

Off-Line Execution: The videos present in the gallery (video database (171)) are run offline for the tag based execution (visual feature network (210), moment localization and classification network (220)). The offline calculated vectors are reduced in dimension and stored in database, to use during a search using a query.

On-Line Execution: During the user search query, for the retrieval of moments, the on-line matching of reduced dimension embedded query vectors is used along with offline calculated vectors in database.

The moment retrieval time with this approach may be less than 20 ms on a video database of 10000 videos.

Figure 7:
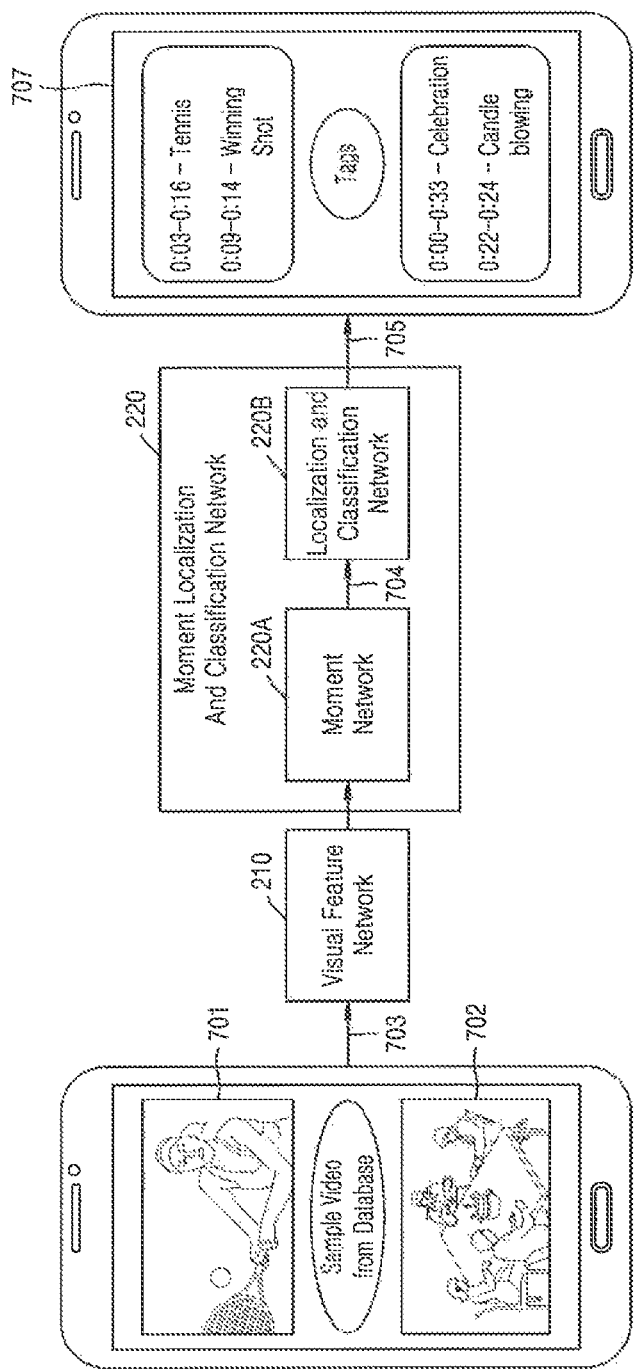
FIG. 7 is a schematic diagram illustrating an example of performing video search, according to an embodiment of the disclosure.

FIG. 7 is a schematic diagram illustrating an example of performing video search, according to an embodiment of the disclosure.

Referring to FIG. 7, the input videos (701) and (702) are present in the video database (171). After the video database (171) receives these videos (701) and (702), the same are forwarded at (703) to the visual feature network (210) for extracting relevant visual features from video frames. Further, the moment network of the moment localization and classification network (220) makes the temporal map of the extracted features, that is output at (704), which helps in localization. Further, the moment localization and classification network (220) generates video tags and associated timestamps and also vectors of the localized videos, that are output at 705, which would help in query based searching.

Thus, as seen at (707), the tag for the input video (701) is "0:03-0:16—Tennis, 0:09-0:14—Winning Shot", whereas the tag for the input video is "0:00-0:33—Celebration, 0:22-0:24—Candle blowing".

Now whenever a query asking for a candle blowing moment or a celebration moment is asked, the electronic device searches the vector database (172) for a similar tag. Once the best match is obtained, the electronic device (100) retrieves the video for the best match from the video database (171).

Figure 8:
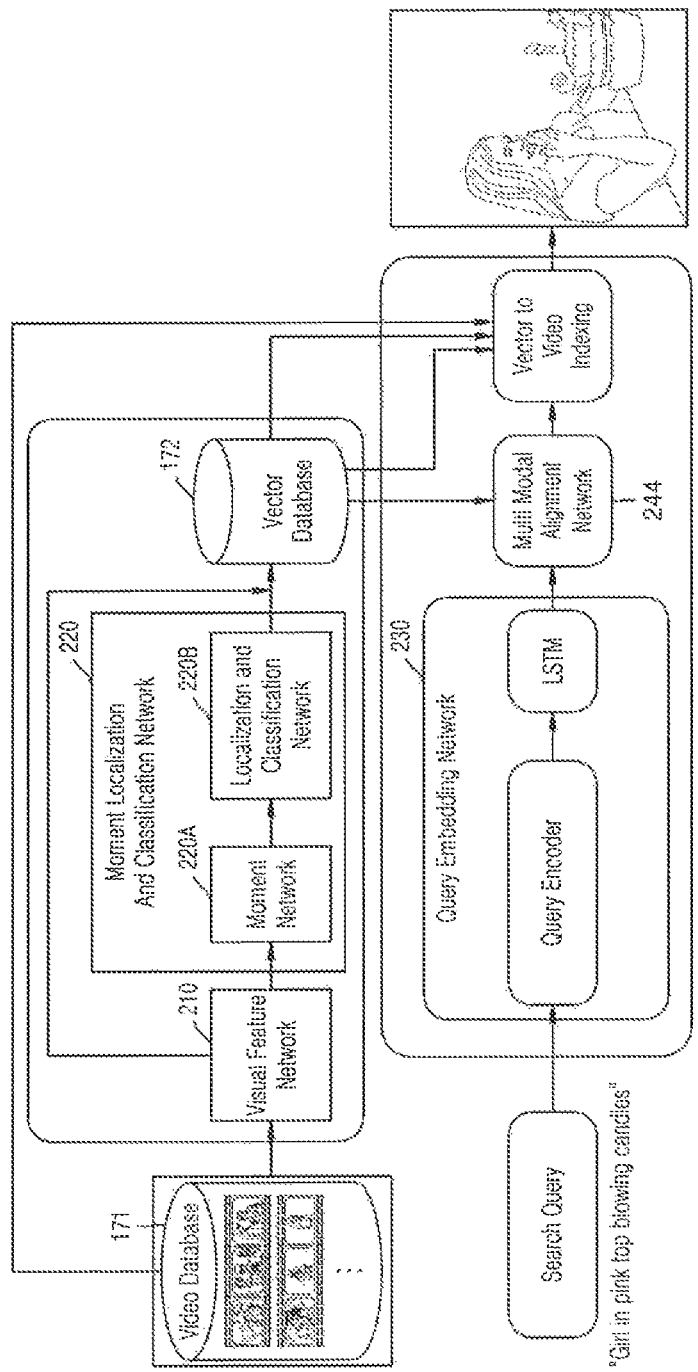
FIG. 8 is a schematic diagram, illustrating an example according to an embodiment of the disclosure.

FIG. 8 is a schematic diagram, illustrating an example according to an embodiment of the disclosure.

Referring to FIG. 8, the query by the user is "Girl in pink dress blowing candle" and the output displayed is the video where the girl is wearing the pink dress and blowing candles. The proposed method and electronic device (100) also provide the option of inputting query in different languages other than English.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method of retrieving a video moment in a video database of an electronic device, the method comprising:
   receiving, by the electronic device, a search query from a user to find the video moment in at least one video from a plurality of videos in the video database;
   extracting, by the electronic device, at least one semantic vector from the search query;
   mapping, by the electronic device, the extracted at least one semantic vector with corresponding visual features moment vector in a pre-stored feature vector database;
   determining, by the electronic device, at least one moment tag and at least one time stamp associated with the mapped visual moment vector; and
   retrieving, by the electronic device, a video moment clip using the at least one moment tag and at least one time stamp from the video database, wherein the video moment clip corresponds to the video moment in the search query,
   wherein the feature vector database is generated by the electronic device from the video database in an offline mode.

2. The method as claimed in claim 1, wherein the video database is a gallery comprising the plurality of videos in the electronic device.

3. The method as claimed in claim 1, wherein the generating of the feature vector database comprises:
   extracting, by the electronic device, a plurality of visual feature vectors comprising visual features from the plurality of videos stored in the video database of the electronic device, wherein each visual feature corresponds to a pre-defined moment;
   generating, by the electronic device, a temporal map of the plurality of visual feature vectors;
   generating, by the electronic device, at least one video tag and at least one time stamp associated with the visual feature vector for each visual feature in the plurality of visual feature vectors; and
   storing, by the electronic device, the at least one video tag, the visual feature vectors, and the at least one time stamp for each visual feature in the feature vector database.

4. A method of video search based on a user query in an electronic device, the method comprising:
   receiving, by the electronic device, a search query from a user for a video moment in a plurality of videos in the electronic device;
   extracting, by the electronic device, semantic vector using natural language processing (NLP) from the search query;
   mapping, by the electronic device, the extracted semantic vector from the search query with at least one visual moment vector stored in a feature vector database of the electronic device;
   determining, by the electronic device, at least one moment tag and at least one time stamp associated with the mapped at least one visual moment vector; and
   extracting, by the electronic device, a video moment corresponding to the query based on the least one moment tag and at least one time stamp from a video database of the electronic device, wherein the feature vector database is generated from the video database in an offline mode.

5. The method as claimed in claim 4, wherein the video moment corresponding to the query is extracted in real time upon receiving the query.

6. The method as claimed in claim 4, wherein the video database corresponds to a gallery of the electronic device comprising the plurality of videos.

7. The method as claimed in claim 5, wherein the generating of the feature vector database comprises:
   extracting, by the electronic device, a plurality of visual feature vectors comprising visual features from the plurality of videos stored in the video database of the electronic device, wherein each visual feature corresponds to a pre-defined moment;
   generating, by the electronic device, a temporal map of the plurality of visual feature vectors;
   generating, by the electronic device, at least one video tag and at least one time stamp associated with the visual feature vector for each visual feature in the plurality of visual feature vectors; and
   storing, by the electronic device, the at least one video tag, the visual feature vectors, and the at least one time stamp for each visual feature in the feature vector database.

8. A method of generating a feature vector database for a plurality of videos in an offline mode in an electronic device, the method comprising:
   extracting, by the electronic device, a plurality of visual feature vectors comprising visual features from a plurality of videos stored in a video database of the electronic device, wherein each visual feature corresponds to a pre-defined moment;
   generating, by the electronic device, a temporal map of the plurality of visual feature vectors;
   generating, by the electronic device, at least one video tag and at least one time stamp associated with the visual feature vector for each visual feature in the plurality of visual feature vectors; and
   storing, by the electronic device, the at least one video tag, the visual feature vectors, and the at least one time stamp for each visual feature in the feature vector database.

9. The method as claimed in claim 8, wherein the extracting, by the electronic device, of the plurality of visual features from the plurality of videos stored in the video database comprises:
   inputting, by the electronic device, each video from the plurality of videos in the videos database to a neural network specific to feature extraction;
   performing, by the neural network specific to feature extraction, a bi-directional shifting of a feature map of the plurality of videos in the video database along a temporal dimension;
   performing, by the neural network specific to feature extraction, an average-maximum pooling in a temporal domain to obtain a pooled clip feature vector;
   determining, by the neural network specific to feature extraction, that a score of the features matches a threshold value; and
   extracting, by the neural network specific to feature extraction, the plurality of visual features from the plurality of videos in response to the threshold value being met.

10. The method as claimed in claim 9, wherein the generating of the temporal map comprises:
   passing, by the electronic device, the pooled clip feature vector through bi-directional gated recurrent units (GRU) to get a moment proposal vector; and
   forming, by the electronic device, a convolutional feature map using the moment proposal vector.

11. The method as claimed in claim 8, wherein the extracting, by the electronic device, of the plurality of feature vectors, the at least one video tag and the at least one time stamp for each visual feature from the plurality of visual features comprises:
   tagging, by the electronic device, each visual feature vector extracted in each video with a specific tag;
   determining, by the electronic device, a time and a duration of each visual feature in each video;
   providing, by the electronic device, the at least one time stamp to each visual feature in each video based on the time and a duration; and
   storing, by the electronic device the plurality of feature vectors, the tags and the at least one time stamp.

12. The method as claimed in claim 8, further comprising:
   receiving, by the electronic device, a search query from a user for a specific moment in a plurality of videos in the electronic device;
   extracting, by the electronic device, linguistic visual features using natural language processing (NLP) from the search query;
   mapping, by the electronic device, the extracted linguistic features from the search query with at least one visual feature vector stored in the feature vector database in the electronic device;
   determining, by the electronic device, at least one moment tag and at least one time stamp associated with the visual features; and
   extracting, by the electronic device, a video moment based on the least one moment tag and at least one time stamp from a video database of the electronic device.

13. The method as claimed in claim 8, wherein the pre-defined moment is an activity in the video.

14. An electronic device for performing video search, the electronic device comprising:
   a memory; and
   a processor configured to:
      extract a plurality of visual features vectors comprising visual features from a plurality of videos stored in a video database of the electronic device, wherein each visual feature corresponds to a pre-defined moment in an offline mode,
      generate a temporal map of the plurality of visual feature vectors in an offline mode,
      generate at least one video tag and at least one time stamp associated with the visual feature vector for each visual feature in the plurality of visual feature vectors in an offline mode,
      store the at least one videos tag, the visual feature vectors, and the at least one time stamp for each visual feature in a feature vector database in an offline mode,
      receive a search query from a user for a specific moment in a plurality of videos in the electronic device,
      run the search query on the feature vector database, and
      control to display the visual features associated with the specific moments from the plurality of videos based on the at least one video tag, the plurality of feature vectors, and the at least one time stamp in the feature vector database.

15. The electronic device as claimed in claim 14, wherein the processor, to extract the plurality of visual features from the plurality of videos stored in the video database, is configured to:
- input each video, from the plurality of videos in the videos database, to a neural network specific to feature extraction;
- perform, by the neural network specific to feature extraction, a bi-directional shifting of a feature map of the plurality of videos in the video database along a temporal dimension;
- perform, by the neural network specific to feature extraction, an average-maximum pooling in a temporal domain to obtain a pooled clip feature vector;
- determine, by the neural network specific to feature extraction, that a score of the features matches a threshold value; and
- extract, by the neural network specific to feature extraction, the plurality of visual features from the plurality of videos in response to the threshold value being met.

16. The electronic device as claimed in in claim 15, wherein the processor, to generate the temporal map, is configured to:
- pass the pooled clip feature vector through bi-directional gated recurrent units (GRU) to get a moment proposal vector; and
- form a convolutional feature map using the moment proposal vector.

17. The electronic device as claimed in claim 14, wherein the processor, to generate the plurality of feature vectors, the at least one video tag, and the at least one time stamps for each visual feature from the plurality of visual features, is configured to:
- tag each visual feature vector extracted in each video with a specific tag;
- determine a time and a duration of each visual feature in each video;
- provide the at least one time stamp to each visual feature in each video based on the time and a duration; and
- store the plurality of feature vectors, the at least one tag, and the at least one time stamp.

18. The electronic device as claimed in claim 14, wherein the processor, to control to display the visual features corresponding to specific event, is configured to:
- extract linguistic visual features using Natural Language Processing (NLP) from the search query;
- compare the extracted linguistic visual features from the search query with the visual features from the plurality of feature vectors using the at least one video tag in the feature vector database;
- identify the visual features vector based on the at least one video tag which has a best match with the linguistic visual features;
- extract the video for which the visual feature is selected from the video database; and
- control to display the extracted video to the user, wherein the extracted video comprises the specific moment asked for in the search query.

19. The electronic device as claimed in claim 14, wherein the pre-defined moment is an activity in the video.

* * * * *